US006653374B1

(12) United States Patent
Jang et al.

(10) Patent No.: US 6,653,374 B1
(45) Date of Patent: Nov. 25, 2003

(54) METHOD OF PREPARING FLAMEPROOF THERMOPLASTIC RESIN COMPOSITION

(75) Inventors: Bok-Nam Jang, Seoul (KR); Se-Jong Kim, Kyungki-do (KR); Young-Kil Chang, Seoul (KR); Gyu-Cheol Lee, Kyungki (KR)

(73) Assignee: Cheil Industries Inc., Kyungbuk (KR)

( * ) Notice: Subject to any disclaimer, the term of this patent is extended or adjusted under 35 U.S.C. 154(b) by 330 days.

(21) Appl. No.: 09/580,907

(22) Filed: May 31, 2000

(30) Foreign Application Priority Data

Jul. 14, 1999 (KR) .............................. 99-28444

(51) Int. Cl.$^7$ ................................. C08K 5/49
(52) U.S. Cl. ................. 524/115; 524/127; 524/141; 524/145; 525/92 D; 525/92 K; 525/134; 525/392; 525/502; 252/607
(58) Field of Search ................. 524/115, 127, 524/141, 145; 525/92 D, 92 K, 134, 392, 502

(56) References Cited

U.S. PATENT DOCUMENTS

| | | | |
|---|---|---|---|
| 4,360,618 A | 11/1982 | Trementozzi | 524/141 |
| 4,433,088 A | 2/1984 | Haaf et al. | 524/153 |
| 4,578,423 A | 3/1986 | Deets et al. | 525/68 |
| 4,618,633 A | 10/1986 | Taubitz et al. | 524/80 |
| 4,632,946 A * | 12/1986 | Muench et al. | 523/179 |
| 4,835,201 A | 5/1989 | Bopp | 524/102 |
| 4,866,126 A | 9/1989 | Mylonakis et al. | 525/68 |
| 4,966,814 A | 10/1990 | Ohzeki | 428/457 |
| 5,100,959 A | 3/1992 | Okada et al. | 525/68 |
| 5,143,955 A | 9/1992 | Kendall | 524/151 |
| 5,206,404 A | 4/1993 | Gunkel et al. | 558/146 |
| 5,290,836 A | 3/1994 | Truyen | 524/127 |
| 5,455,292 A | 10/1995 | Kakegawa et al. | 524/141 |
| 5,605,962 A | 2/1997 | Suzuki et al. | 525/70 |
| 5,621,029 A | 4/1997 | Eckel et al. | 524/127 |
| 5,643,981 A | 7/1997 | Yang et al. | 524/141 |
| 5,672,645 A | 9/1997 | Eckel et al. | 524/127 |
| 5,674,924 A | 10/1997 | Lee et al. | 523/201 |
| 5,952,408 A * | 9/1999 | Lee et al. | 524/127 |
| 6,124,385 A | 9/2000 | Honl et al. | 524/115 |
| 6,140,399 A * | 10/2000 | Munro | 524/127 |
| 6,437,029 B1 * | 8/2002 | Lim et al. | 524/97 |
| 6,451,889 B1 * | 9/2002 | Jang et al. | 524/127 |

FOREIGN PATENT DOCUMENTS

JP          60-063251 A      4/1985      .............. 524/127

* cited by examiner

*Primary Examiner*—Margaret Medley
(74) *Attorney, Agent, or Firm*—Maria Parrish Tungol

(57) ABSTRACT

The flameproof thermoplastic resin composition of the present invention comprises (A) 40 to 95 parts by weight of a rubber modified styrene-containing resin composed of ($a_1$) 20 to 100% by weight of a styrene-containing graft copolymer resin including 18 to 50% by weight of acrylonitrile in the copolymer excluding rubber; and ($a_2$) 0 to 80% by weight of a styrene-containing copolymer resin containing 18 to 50% by weight of acrylonitrile; (B) 5 to 60 parts by weight of polyphenylene ether resin; (C) 2 to 40 parts by weight of a styrene-containing copolymer or styrene-containing graft copolymer resin containing 5 to 18% by weight of acrylonitrile per 100 parts by weight of the sum of (A) and (B); and (D) 5 to 30 parts by weight of an aromatic phosphoric acid ester compound per 100 parts by weight of the sum of (A) and (B). The method of preparing the flameproof thermoplastic resin is (i) preparing master batch in the range of 40 to 95 parts by weight of polyphenylene ether (PPE) (B), 5 to 60 parts by weight of styrene-containing graft copolymer resin or styrene-containing copolymer resin having 5 to 18% by weight of acrylonitrile content and 0 to 30 parts by weight of aromatic phosphoric acid ester compound (D) at 250 to 300° C. of molding temperature; and (ii) adding a rubber modified styrene-containing resin (A) and an aromatic phosphoric acid ester compound (D) to the master batch and extruding at 200 to 260° C. of molding temperature to be a final resin comprising 40 to 95 parts by weight of ABS resin, 5 to 60 parts by weight of PPE (B) and 5 to 30 parts by weight of aromatic phosphoric acid ester compound (D).

10 Claims, No Drawings

METHOD OF PREPARING FLAMEPROOF THERMOPLASTIC RESIN COMPOSITION

FIELD OF THE INVENTION

The present invention relates to a method of preparing flameproof thermoplastic resin composition. More particularly, the present invention relates to a method of preparing flameproof thermoplastic resin composition using an ABS resin and a polyphenylene ether resin as a base resin, a styrene-acrylonitrile copolymer containing from 5 to 18% by weight of acrylonitrile as a compatibilizer, and an aromatic phosphoric acid ester compound as a main flame retardant.

BACKGROUND OF THE INVENTION

A rubber modified styrene-containing resin has a good processability, a high impact strength, and a good appearance. Accordingly, the resin has been widely applied to electric appliances and office supplies. In case that a rubber modified styrene-containing resin is applied to personal computers, facsimiles, and the like, which emit heat, flame-retardant property should be given to the resin due to a combustibility.

A widely known method for the flame retardancy is that halogen-containing compounds or antimony-containing compounds are added to a rubber modified styrene-containing resin to give flame-retardant property. The halogen-containing compounds used in above method are, for example, polybromodiphenyl ether, tetrabromobisphenol A, epoxy compounds substituted by bromine, chlorinated polyethylene, etc. An antimony trioxide and an antimony pentaoxide are commonly used as antimony-containing compounds.

The methods for improvement of flame-retardant property by applying halogen- and antimony-containing compound have advantages such as easy acquirement of the flame-retardant property and no degradation of the physical properties. However, the disadvantages could be observed that the halogen-containing compound results in the corrosion of the mold itself by the hydrogen halide gases released during the molding process and is fatally harmful due to the toxic gases liberated in case of fire. Especially, since a polybromodiphenyl ether, mainly used for a halogen-containing flame retardant, can produce toxic gases such as dioxin or furan during combustion, flame retardants which are not prepared with halogen-containing compound have become main concerns in this field.

It is commonly known a method to apply phosphorus or nitrogen compounds as halogen-free flame retardant to a resin composition. However, usage of only phosphorus compound deteriorates heat resistance of a rubber modified styrene-containing resin and does not impart sufficient flame retardancy.

Generally, when a rubber modified styrene-containing resin such as ABS is burned, a char is not produced due to decomposition and vaporization in most parts (Journal of Applied Polymer Science, 1998, vol 68, p1067). Therefore, to impart an effect of flame retardancy, it is necessary to add a char-forming agent to a resin composition, which plays a role to prohibit entrance of oxygen and emission of fuel by forming char on the surface of rubber with three-dimensional carbon chain bonds under combustion.

Japanese Patent Laid-open No. 7-48491 discloses a flameproof thermoplastic resin, made of adding a novolac phenolic resin and a phosphoric acid ester into a thermoplastic copolymer resin composed of a rubber copolymer and an aromatic vinyl monomer. It was found that in order to obtain a good property of flame retardancy, a phenolic resin as a char-forming agent and a phosphoric acid ester compound as a flame retardant should be added in a lot of amount. However, in this case, the heat resistance of the resin composition is dropped suddenly.

U.S. patent application Ser. No. 09/233415 discloses a halogen-free flameproof resin composition having a good property of flame retardancy prepared by mixing a styrene-acrylonitrile (SAN) copolymer having from 5 to 18% by weight of acrylonitrile as a compatibilizer, an aromatic phosphoric acid ester compound as a main flame-retardant and a phenolic resin as a further flame-retardant to improve flame-retardant property of a resin composition and adding the mixture to a base resin comprising a rubber-modified styrene-containing resin and a polyphenylene ether resin. Good mechanical properties as well as a good improvement of flame retardancy and heat resistance were obtained, however, a phenolic resin used as char-forming agent of ABS resin causes the degradation of heat stability and weatherability.

The present inventors have found flameproof resin composition containing no phenolic resin in order to solve the above-mentioned problem. Generally, as the blend comprising an ABS resin and a polyphenylene ether resin have no compatibility each other, physical properties are degraded during extrusion processing to cause a poor property of mechanical strength. Accordingly, the present inventors have invented phenol-free flameproof thermoplastic resin composition which has a good property of mechanical strength by adding a styrene-acrylonitrile (SAN) copolymer or ABS resin containing a particular amount of acrylonitrile therein as a compatibilizer, in order to impart compatibility to the blend comprising an ABS resin and a polyphenylene resin.

OBJECTS OF THE INVENTION

An object of the present invention is to provide a method of preparing a thermoplastic resin composition which has a good mechanical property, heat resistance and flame retardancy.

Another object of the present invention is to provide a method of preparing a flameproof thermoplastic resin composition which does not contain halogen-containing compounds which causes the environmental pollution during the preparation or combustion of the resin.

A further object of the present invention is to provide a thermoplastic resin composition which contains no phenolic resin and imparts compatibility to a blend comprising an ABS resin and a polyphenylene resin by adding a SAN or ABS copolymer containing a particular amount of acrylonitrile as a compatibilizer.

A further object of the present invention is to provide a flameproof thermoplastic resin composition according to the said method.

Other objects and advantages of this invention will be apparent from the ensuing disclosure and appended claims.

SUMMARY OF THE INVENTION

A flameproof thermoplastic resin composition of the present invention comprises (A) 40 to 95 parts by weight of a rubber modified styrene containing resin composed of ($a_1$) 20 to 100% by weight of a styrene-containing graft copolymer resin including 18 to 50% by weight of acrylonitrile in the copolymer excluding rubber; and ($a_2$) 0 to 80% by weight of a styrene-containing copolymer resin containing 18 to 50% by weight of acrylonitrile; (B) 5 to 60 parts by weight of polyphenylene ether resin; (C) 2 to 40 parts by weight of a styrene-containing copolymer or styrene-containing graft copolymer resin having 5 to 18% by weight of acrylonitrile in the copolymer excluding per 100 parts by weight of the sum of (A) and (B); and (D) 5 to 30 parts by weight of an aromatic phosphoric acid ester compound per 100 parts by weight of the sum of (A) and (B). The method of preparing the flameproof thermoplastic resin is (i) preparing a master batch in the range of 40 to 95 parts by weight of polyphenylene ether (PPE) (B), 5 to 60 parts by weight of styrene-containing graft copolymer resin or styrene-containing copolymer resin having 5 to 18% by weight of acrylonitrile content, and 0 to 30 parts by weight of aromatic phosphoric acid ester compound (D) at 250 to 300° C. of molding temperature; and (ii) adding a rubber modified styrene-containing resin (A) and an aromatic phosphoric acid ester compound (D) to the master batch and extruding at 200 to 260° C. of molding temperature to be a final resin comprising 40 to 95 parts by weight of ABS resin, 5 to 60 parts by weight of PPE (B), and 5 to 30 parts by weight of aromatic phosphoric acid ester compound (D).

DETAILED DESCRIPTION OF THE INVENTION

The flameproof thermoplastic resin composition according to the present invention comprises (A) 40 to 95 parts by weight of a ABS resin composed of ($a_1$) 20 to 100% by weight of a graft ABS copolymer resin including 18 to 50% by weight of acrylonitrile in the copolymer excluding rubber; and ($a_2$) 0 to 80% by weight of a styrene-containing copolymer resin containing 18 to 50% by weight of acrylonitrile; (B) 5 to 60 parts by weight of polyphenylene ether resin; (C) 2 to 40 parts by weight of a SAN or graft ABS copolymer resin which uses optionally rubber, containing 5 to 18% by weight of acrylonitrile in the copolymer excluding rubber component per 100 parts by weight of the sum of (A) and (B); and (D) 5 to 30 parts by weight of an aromatic phosphoric acid ester compound per 100 parts by weight of the sum of (A) and (B). The method of preparing the flameproof thermoplastic resin is (i) preparing master batch in the range of 40 to 95 parts by weight of polyphenylene ether (PPE) (B), 5 to 60 parts by weight of styrene-containing graft copolymer resin or styrene-containing copolymer resin having 5 to 18% by weight of acrylonitrile content and 0 to 30 parts by weight of aromatic phosphoric acid ester compound (D) at 250 to 300° C. of molding temperature; and (ii) adding a rubber modified styrene-containing resin (A) and an aromatic phosphoric acid ester compound (D) to the master batch and extruding at 200 to 260° C. of molding temperature to be a final resin comprising 40 to 95 parts by weight of ABS resin, 5 to 60 parts by weight of PPE (B) and 5 to 30 parts by weight of aromatic phosphoric acid ester compound (D).

A resin composition according to present invention is composed of a ABS resin(A) including a graft ABS copolymer resin ($a_1$) and optionally a SAN copolymer ($a_2$), a polyphenylene ether resin (B), a styrene-acrylonitrile copolymer or graft copolymer resin containing 5 to 18% by weight of acrylonitrile (C) and an aromatic phosphoric acid ester compound (D).

It is preferable to blend (A) 40 to 95 parts by weight of a rubber modified styrene-containing resin; (B) 5 to 60 parts by weight of a polyphenylene ether resin; (C) 2 to 40 parts by weight of a SAN or ABS copolymer which contains 5 to 18% by weight of acrylonitrile per 100 parts by weight of the sum of (A) and (B); and (D) 5 to 30 parts by weight of an aromatic phosphoric acid ester compound per 100 parts by weight of the sum of (A) and (B).

The ABS resin (A) is composed of 20 to 100% by weight of a graft ABS copolymer resin ($a_1$) and 0 to 80% by weight of a SAN copolymer resin containing 18 to 50% by weight of acrylonitrile.

The present invention employs ABS resin (A) including 18 to 50% by weight of acrylonitrile in the copolymer excluding rubber and polyphenylene ether resin (B) as a base resin, SAN copolymer or graft ABS copolymer containing 5 to 18% by weight of acrylonitrile (C) as a compatibilizer of base resin, and an aromatic phosphoric acid ester compound (D) as main flame retardant.

The detailed descriptions of components of the resin composition according to the present invention are as follows:

(A) ABS Resin

In ABS resin which is prepared of aromatic vinyl copolymers, rubber phase copolymers are dispersed in the form of particles in a matrix. The resin is prepared by mixing an aromatic vinyl monomer and a vinyl-containing monomer, which can be polymerized therewith, in the presence of a rubber phase polymer.

Such ABS resin is prepared by a known method such as emulsion polymerization, suspension polymerization or bulk polymerization, and is conventionally produced by an extrusion with a graft ABS copolymer resin and a SAN copolymer resin. In a bulk polymerization, both graft ABS copolymer resin and a SAN copolymer resin are not prepared separately but prepared together in one process, thereby to produce an ABS resin. In either case, the contents of rubber in a final rubber modified styrene-containing resin to the total weight of the base resin are preferably in 5 to 30% by weight. The acrylonitrile-butadiene-styrene(ABS) copolymer resin used as (A) component in the present invention can be substituted by acrylonitrile-acryl rubber-styrene (AAS) copolymer resin and/or acrylonitrile-ethylenepropylene rubber-styrene (AES) copolymer resin in part or all.

($a_1$) Graft ABS Copolymer Resin

Examples of a rubber used for a styrene-containing graft copolymer resin are a diene-containing rubber such as polybutadiene, poly(styrene-butadiene) and poly(acrylonitrile-butadiene); a saturated rubber in which hydrogen is added to said diene-containing rubber; an isoprene rubber; a chloroprene rubber; a polyacrylic acid butyl; and a terpolymer of ethylene-propylene-diene. It is preferable to use a diene-containing rubber, more preferably a butadiene-containing rubber.

Aromatic vinyl-containing monomers for use preparing the graft copolymer are styrene, α-methylstyrene, p-methylstyrene, etc. In the above examples, styrene is most preferable. At least one copolymerizable monomer may be introduced and applied to said aromatic vinyl monomers. It is preferable that said copolymerizable monomer is a cyanide vinyl-containing compound such as acrylonitrile and methacrylonitrile.

The content of rubber is preferably in the range of 10 to 60% by weight based on the total weight of a graft copolymer resin. Except rubber component, it is preferable that the aromatic vinyl group-containing monomer component is 50 to 82% by weight, and the vinyl cyanide or unsaturated nitrile-containing monomer component is 18 to 50% by weight. In addition, in order to give good characteristics of processability and heat resistance, the monomers such as acrylic acid, methacryl acid, maleic anhydride and N-substituted maleimide can be added in the graft polymerization. The amounts of the monomers are in the range of 0 to 40% by weight based on the styrene-containing graft copolymer resin.

To acquire good impact strength and appearance when said styrene-containing graft copolymer is prepared, the average size of rubber particles is preferred to be in the range of from 0.1 to 4 μm.

(a$_2$) SAN Copolymer Resin

The SAN copolymer resin is prepared in accordance with the proportion and compatibility of the monomers excluding rubbers in the components of graft ABS copolymer resin prepared as above. The SAN copolymer resin is prepared introducing at least one copolymerizable monomer and the aromatic vinyl monomers.

The examples of the aromatic vinyl-containing monomer are styrene, α-methylstyrene, p-methylstyrene, etc. Styrene is the most preferable. The aromatic vinyl-containing monomer in the total copolymer resin is contained in the amount of 50 to 82% by weight. At least one copolymerizable monomer is used with said aromatic vinyl-containing monomer. The preferable examples of the copolymerizable monomer are cyanide vinyl-containing compounds such as acrylonitrile and methacrylonitrile. It is preferable that 18 to 50% by weight of the copolymerizable monomer to the total copolymer is employed. In addition, 0 to 40% by weight of a monomer such as acrylic acid, methacrylic acid, maleic anhydride and N-substituted maleimide may be added and copolymerized thereto.

In the present invention, the ABS resin (A) is composed of 20 to 100% by weight of a graft ABS copolymer resin (a$_1$) which contains 18 to 50% by weight of acrylonitrile in the copolymer except rubber and 0 to 80% by weight of a SAN copolymer resin (a$_2$) including 18 to 50% by weight of acrylonitrile. The ABS resin (A) is employed as a base resin along with a polyphenylene ether (B). The base resin comprises 40 to 95 parts by weight of the ABS resin (A) and 5 to 60 parts by weight of the polyphenylene ether resin (B).

(B) Polyphenylene Ether Resin

Polyphenylene ether resin is employed as a base resin to improve flame retardancy, heat resistance and rigidity of the resin composition according to the present invention. As examples of the polyphenylene ether resin, poly(2,6-dimethyl-1,4-phenylene) ether, poly(2,6-diethyl-1,4-phenylene) ether, poly(2,6-dipropyl-1,4-phenylene) ether, poly(2-methyl-6-ethyl-1,4-phenylene) ether, poly(2-methyl-6-propyl-1,4-phenylene) ether, poly(2-ethyl-6-propyl-1,4-phenylene) ether, poly(2,6-diphenyl-1,4-phenylene) ether, copolymer of poly(2,6-dimethyl-1,4-phenylene) ether and poly(2,3,6-trimethyl-1,4-phenylene) ether, and copolymer of poly(2,6-dimethyl-1,4-phenylene) ether and poly(2,3,5-triethyl-1,4-phenylene) ether can be used. Preferably, copolymer of poly(2,6-dimethyl-1,4-phenylene) ether and poly(2,3,6-trimethyl-1,4-phenylene) ether, and poly(2,6-dimethyl-1,4-phenylene) ether are preferably used, more preferably poly(2,6-dimethyl-1,4-phenylene) ether is used. The degree of polymerization of polyphenylene ether is not defined specifically, but considering heat-stability or processability of the resin composition, it is preferable that the viscosity of polypheylene ether is in the range of 0.1 to 0.8 measured in chloroform solvent at 25° C.

(C) SAN Copolymer or Graft ABS Copolymer Resin Having from 5 to 18% by Weight of Acrylonitrile The SAN copolymer or graft ABS copolymer resin is added to the base resin to improve compatibility between the ABS resin (A) and the polyphenylene ether resin (B). The styrene-acrylonitrile copolymer or styrene-containing graft copolymer employed in this invention comprise 82 to 95% by weight of a styrene and 5 to 18% by weight of acrylonitrile, exclusive rubber. To prepare the styrene-containing graft copolymer, a styrene-containing coploymer is grafted with up to 60% by weight of rubber.

The method for polymerization of the styrene-acrylonitrile copolymer above may optionally be selected from emulsion polymerization, suspension polymerization, and bulk polymerization in accordance with conventional techniques. It is preferable that the weight average molecular weight of the copolymer is in the range of from 50,000 to 300,000. Other monomers may be employed for copolymerization with styrene-acrylonitrile. The examples of the other monomers are metacrylate, maleic anhydride, phenyl maleimide, etc. To advance heat resistance, α-substituted-styrene may be used instead of styrene. The styrene-acrylonitrile copolymer or graft ABS copolymer resin is added to improve compatibility between the ABS resin (A) and the polyphenylene ether resin (B). The amount of a styrene-acrylonitrile copolymer or graft ABS copolymer resin used as compatibilizer is preferably 2 to 40 parts by weight per 100 parts by weight of the base resin the sum of (A) and (B). If the copolymer (C) is not added, the resin composition shows reduction in mechanical properties due to low compatibility.

(D) Aromatic Phosphoric Acid Ester Compound

The aromatic phosphoric acid ester compound used in the present invention is a compound having the following structural formula (I):

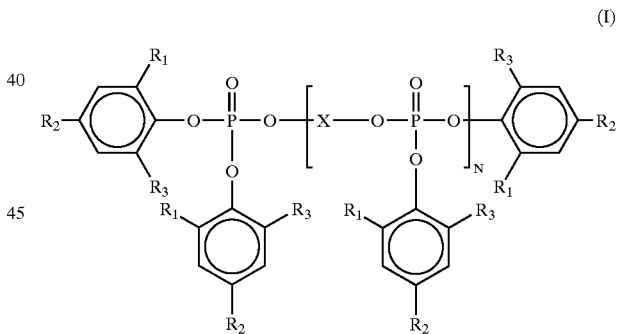

wherein R$_1$, R$_2$ and R$_3$ independently of one another are hydrogen or C$_1$–C$_4$ alkyl, X is a dialcohol derivative such as resorcinol, diphenol, hydroquinol, bisphenol-A and bisphenol-S, and N is 0~4.

In the structural formula (I), where N is 0, the compound is monophosphate including tri(2,6-dimethyl phenyl) phosphate, tri(2,4,6-trimethyl phenyl) phosphate, tri(2,4-ditertiary butyl phenyl) phosphate, tri(2,6-ditertiary butyl phenyl) phosphate, and the like, and where N is 1, the compound include resorcinol bis(diphenyl) phosphate, resorcinol bis(2,6-dimethyl phenyl) phosphate, resorcinol bis(2,4-ditertiary butyl phenyl) phosphate, hydroquinone (2,6-dimethyl phenyl) phosphate, hydroquinone(2,4-ditertiary butyl phenyl) phosphate, and the like. The combination can be used alone or in combination therewith.

In addition, a phosphoric acid ester compound having a structure of fluoroglucinol can be used in this invention. The phosphoric acid ester compound is represented as follow:

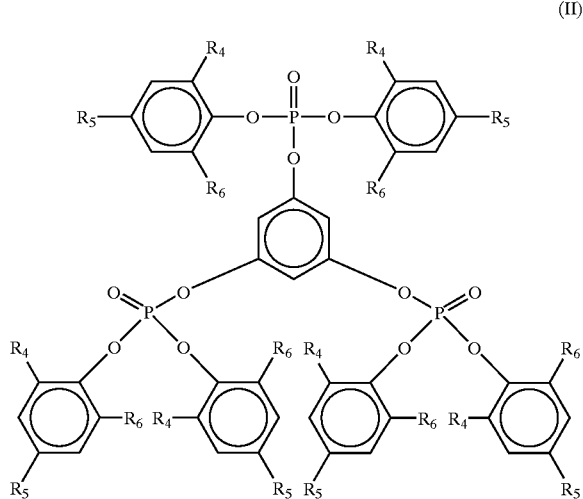
(II)

wherein $R_4$, $R_5$ and $R_6$ independently of one another are hydrogen or $C_1$–$C_4$ alkyl.

Examples of the phosphoric acid ester compound having the structural formula (II) include 1,3,5-tri(diphenyl phosphate) fluoroglucinol, 1,3,5-tri(dicresyl phosphate) fluoroglucinol, 1,3,5-tri(dixylenyl phosphate) fluoroglucinol, and the like. However, it is preferable that the compound or mixture has a molecular weight of less than 1,500, because the compound having a molecular weight of more than 1,500 does not provide the resin with a good flame-retardancy. Also, it is preferable that the phosphoric acid ester compound has a melting point of more than 90° C. The phosphoric acid ester compound having a melting point of below 90° C. can be used together if the heat deformation temperature required to apply for commercial purposes is maintained at more than 90° C.

In the present invention, the aromatic phosphoric acid ester compound as a flame retardant is used in the amount of from 5 to 30 parts by weight per 100 parts by weight of the base resin.

The method of preparing the flameproof thermoplastic composition according to the present invention comprises following 2 steps.

The first step is (i) preparing a master batch in the range of 40 to 95 parts by weight of polyphenylene ether (PPE) (B), 5 to 60 parts by weight of styrene-containing graft copolymer resin or styrene-containing copolymer resin having 5 to 18% by weight of acrylonitrile content and 0 to 30 parts by weight of aromatic phosphoric acid ester compound (D) at 250 to 300 ° C. of molding temperature. To blend polyphenylene ether resin (B) with ABS resin, it is necessary to prepare master batch primarily by blending ABS or SAN including 18 to 50% by weight of acrylonitrile in the copolymer excluding rubber (C) and phosphate (D) as a plasticizer with polyphenylene ether resin (B).

The second step is (ii) adding a ABS resin (A) and an aromatic phosphoric acid ester compound(D) to the master batch and extruding at 200 to 260° C. of molding temperature to be a final resin comprising 40 to 95 parts by weight of ABS resin, 5 to 60 parts by weight of PPE (B) and 5 to 30 parts by weight of aromatic phosphoric acid ester compound (D).

By this 2-step blending process, PPE having relatively higher working temperature than other components can be mixed easily. If PPE is preferably mixed with flameproof thermoplastic composition, the final resin composition has a developed physical property. So to speak, if ABS resin including 18 to 50% by weight of acrylonitrile in the copolymer excluding rubber (A), PPE (B), SAN having 5 to 18% by weight of acrylonitrile (C) and phosphate (D) are mixed altogether in one step, the physical property fluctuation of the final resin is very large because PPE (B) is not mixed with rubber modified styrene-containing resin (A) well due to relatively higher working temperature of PPE (B) than other components. Therefore it is necessary to prepare a master batch by blending PPE (B) with SAN or ABS (C) having 5 to 18% by weight of acrylonitrile contents and a part of phosphate at first step, and to blend the master batch with ABS resin (A) and residual phosphate (D) at second step to prepare the final resin composition.

If necessary, a resin such as polyamide, polycarbonate, polyester, polystyrene, rubber reinforced polystyrene, polyacetal, polymethacrylic acid methyl, and silicon resin may be added optionally to the resin composition of this invention in the amount of from 0 to 30 parts by weight per 100 parts by weight of the base resin.

Other additives may be contained in the resin composition of the present invention. The additives include an anti-dripping agent, an impact modifier, plasticizer, a heat stabilizer, an oxidation inhibitor, a light stabilizer, a compatibilizer and the like. An inorganic filler such as talc, silica, mica, glass: fiber, an organic or inorganic pigment and/or dye can be added too. The additives are employed in the amount of 0 to 50 parts by weight on the basis of 100 parts by weight of the base resin.

The resin composition according to the present invention has Izod impact strength (⅛" notched) of 10 to 30 kg·cm/cm and heat deformation temperature of more than about 90° C. Further, the resin composition has flame retardancy (1/10") of V-0 or V-1, a good property of heat stability, and good characteristics of other physical properties.

The invention may be better understood by reference to the following examples which are intended for the purpose of illustration and are not to be construed as in any way limiting the scope of the present invention, which is defined in the claims appended hereto. In the following examples, all parts and percentage are by weight unless otherwise indicated.

EXAMPLES

The components of (A) rubber modified styrene-containing resin, (B) polyphenylene ether resin, (C) styrene-acrylonitrile copolymer having 5 to 18% by weight of acrylonitrile, and (D) phosphoricacid ester compound in the Example and Comparative Examples are as follows:

(A) ABS Resin

The ABS resin is prepared by mixing ($a_1$) 40% by weight of styrene-containing graft copolymer resin and ($a_2$) 60% by weight of styrene-containing copolymer.

($a_1$) Graft ABS Copolymer Resin 50 parts of butadiene rubber latex powder, 36 parts of styrene, 14 parts of acrylonitrile and 150 parts of deionized water were blended. To the blend, 1.0 parts of potassium oleate, 0.4 parts of cumenhydroperoxide, 0.2 parts of mercaptan-containing chain transfer agent, 0.4 parts of glucose, 0.01 parts of ferrous sulfate hydrate, and 0.3 parts of sodium pyrophosphate were added. The blend was kept at 75° C. for 5 hours to obtain ABS latex. To the ABS latex, 0.4 parts of sulfuric acid was added and coagulated to obtain styrene-containing graft copolymer resin (g-ABS) in a powder form.

($a_2$) SAN with 25% by weight of AN 75 parts of styrene, 25 parts of acrylonitrile, 120 parts of deionized water and 0.2 parts of azobisisobutylonitrile were blended. To the blend, 0.4 parts of tricalciumphosphate and 0.2 parts of mercaptan-containing chain transfer agent were added. The resultant solution was heated to 80° C. for 90 minutes and kept for 180 minutes. The resultant was washed, dehydrated and dried to produce SAN powder. styrene-acrylonitrile copolymer (SAN) having a weight average molecular weight of 160,000 to 200,000 was obtained.

(B) Polyphenylene Ether Resin

Poly(2,6-dimethyl-1,4-phenyl) ether with an intrinsic viscosity of 0.42 at chloroform solution was used. The particles had the average size of several microns (C) SAN Copolymer with 13% by Weight of AN 87 parts of styrene, 13 parts of acrylonitriile, 120 parts of deionized water, 0.1 parts of azobisisobutylonitrile 0.2 parts of 1,1'-di(tertiarybutylperoxy)-3,3',5-trimethylcyclohexane 0.4 parts of tricalciumphosphate and 0.2 parts of mercaptan-containing chain transfer agent were blended. The blended solution was heated up to 80° C. for 90 minutes and was kept it for 150 minutes. The solution was heated up to 95° C. again and kept for 120 minutes. The resultant was washed, dehydrated and dried. Styrene-acrylonitrile copolymer (SAN) having a weight average molecular weight from 100,000 to 140,000 and 13% of acrylonitrile content was obtained.

(D) Triphenyl Phosphate

Triphenylphosphate (TPP) with a melting point of 48° C. was used.

Example 1

The first step: 70 parts of PPE, 30 parts of SAN having 13% by weight of acrylonitrile contents and 10 parts of TPP were blended and extruded in the form of pellets with a 45 Φ twin-screw extruder at 270° C.

The second step: 47 parts of master batch prepared at the first step, 28 parts of graft ABS resin ($a_1$), 29.2 parts of normal SAN resin ($a_2$) with 25% by weight of acrylonitrile and 12.7 parts of TPP were blended and extruded in the form of final resin components with a 45 Φ twin-screw extruder at 230° C.

Comparative Example 1

28 parts of Normal graft ABS resin ($a_1$), 42 parts of normal SAN resin ($a_2$) with 25% by weight of AN, 30 parts of PPE and 17 parts of TPP were blended and extruded in the form of pellets with a 45 Φ twin-screw extruder at 270° C. in one step.

Comparative Example 2

28 parts of Normal graft ABS resin ($a_1$), 29.2 parts of SAN resin ($a_2$) with 25% by weight of AN, 12.8 parts of SAN resin with 13% by weight of AN, 30 parts of PPE and 17 parts of TPP were blended and extruded in the form of pellets with a 45 Φ twin-screw extruder at 270° C. in one step.

The pellets were dried at 80° C. for 3 hours and extruded into test specimens in a 6 oz. extruder at molding temperature of 220~280° C. and barrel temperature of 40~80° C., and the resin pellets were molded into test specimens. Impact strengths of the test specimens of Example and Comparative Examples were measured according to Izod impact strength ASTM D-256 (⅛" notch), Vicat softening temperatures ere measured according to ASTM D-648 under 4.6 kg and flame retardancy (1/10") was measured according to UL94 VB. The test results are presented in Table 1.

TABLE 1

| | Example 1 | Comparative Example 1 | Comparative Example 2 |
|---|---|---|---|
| Izod impact Strength (⅛", kg · cm/cm) | 25 | 6 | 17 |
| Vicat softening temperature (° C.) | 91 | 92 | 91 |
| Flame retardancy (1/10") | V-1 | V-1 | V-1 |
| degree of luster | 95 | 80 | 87 |

A flameproof resin applied for commercial purpose should have Izod impact strength of more than 10, and heat deformation temperature of over about 90° C. According to Example 1, the compatibility between ABS resin and polyphenylene ether resin is developed by using composition (C). Therefore it shows exellent impact strength, heat resistance, flam resistance and thermal stability.

When compared with impact strengths, Comparative Example 1 not employing the component (C) showed impact strength reduced. As described above, the resin composition of the this invention obtains good mechanical properties due to compatibility improved by adding the resin (C) to the base resin.

Comparative Example 2 has the same compositions of (A), (B), (C) as Example 1 except that Comparative Example 2 is one-step process whereas Example 1 is two-step process. Example 1 has the better impact strength and degree of luster despite the same composition. It means that each component was well mixed in Example 1.

The present invention can be easily carried out by an ordinary skilled person in the art. Many modifications and changes may be deemed to be with the scope of the present invention as defined in the following claims.

What is claimed is:

1. A method of preparing a flameproof thermoplastic resin composition comprising:
(A) a rubber modified styrene-containing resin composed of
($a_1$) 20 to 100% by weight of a styrene-containing graft copolymer resin including 18 to 50% by weight of acrylonitrile in the copolymer excluding rubber; and
($a_2$) 0 to 80% by weight of a styrene-containing copolymer resin containing 18 to 50% by weight of acrylonitrile;
(B) polyphenylene ether resin;
(C) a styrene-containing copolymer or a styrene-containing graft copolymer resin optionally containing rubber having 5 to 18% by weight of acrylonitrile in the copolymer excluding rubber component per 100 parts by weight of the sum of (A) and (B); and
(D) an aromatic phosphoric acid ester flame retardant per 100 parts by weight of the sum of (A) and (B) wherein the method comprises:
(i) preparing a master batch comprising 40 to 95 parts by weight of polyphenylene ether (B), 5 to 60 parts by weight of (C), and 0 to 30 parts by weight of aromatic phosphoric acid ester (D) at a molding temperature of 250 to 300° C.; and
(ii) adding (A) and an aromatic phosphoric acid ester (D) to the master batch and extruding the mixture at a molding temperature of 200 to 260° C., wherein the amounts of (A) and (D) added in step (ii) result in a thermoplastic resin composition comprising 40 to 95 parts by weight of (A), 5 to 60 parts by weight of (B), 2 to 40 parts by weight of (C) per 100 parts by weight of the sum of (A) and (B), and 5 to 30 parts by weight of (D) per 100 parts by weight of the sum of (A) and (B).

2. The method as defined in claim 1 wherein (D) is represented by following formula (I);

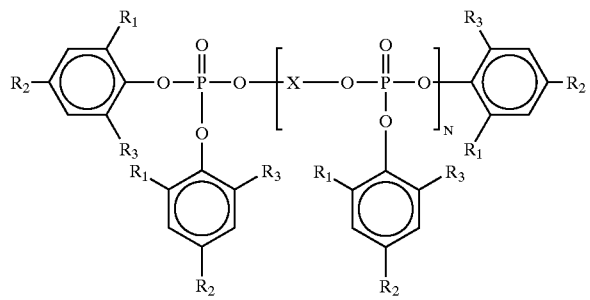

wherein $R_1$, $R_2$ and $R_3$ independently of one another are hydrogen or alkyl, X is a dialcohol derivative such as resorcinol, diphenol, hydroquinol, bisphenol-A and bisphenol-S, and N is the number of repeating unit and is 0~4.

3. The method as defined in claim 2 wherein (D) further comprises a phosphoric acid ester represented by following formula:

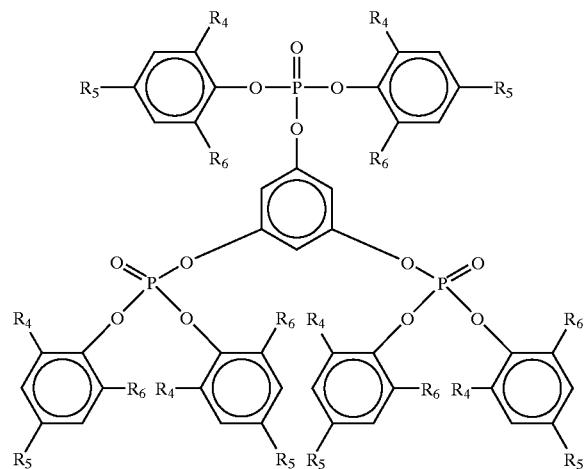

wherein $R_4$, $R_5$ and $R_6$ independently of one another are hydrogen or alkyl.

4. The method as defined in claim 2 wherein (D) has a melting point of 90° C. or more.

5. The method as defined in claim 1 wherein said polyphenylene ether resin is poly (2,6-dimethyl-1,4-phenylene) ether.

6. The method as defined in claim 1 wherein (C) is a styrene-containing graft copolymer grafted with up to 60% by weight of rubber.

7. The method as defined in claim 1 wherein (C) is a styrene-containing copolymer prepared from the copolymerization of styrene, acrylonitrile and a monomer selected from the group consisting of methacrylate, maleic anhydride and phenyl maleimide.

8. The method as defined in claim 1 wherein said thermoplastic resin composition further comprises 0 to 30 parts by weight of a resin selected from the group consisting of polyamide, polycarbonate, polyester, polystyrene, rubber-reinforced polystyrene, polyacetal, polymethacrylic acid methyl, silicone resin and a mixture thereof, per 100 parts by weight of the base resin (A) and (B).

9. The method as defined in claim 1 further comprising adding a plasticizer, a heat stabilizer, an oxidation inhibiter, a light stabilizer, a compatibilizer, pigments, dyes and/or an inorganic filler in the second step.

10. The method as defined in claim 1 wherein component (A) is an ABS resin, an acrylonitrile-acryl rubber-styrene (AAS) resin, an acrylonitrile-ethylenepropylene rubber-styrene (AES) resin or a mixture thereof.

* * * * *